United States Patent Office 3,475,948
Patented Nov. 4, 1969

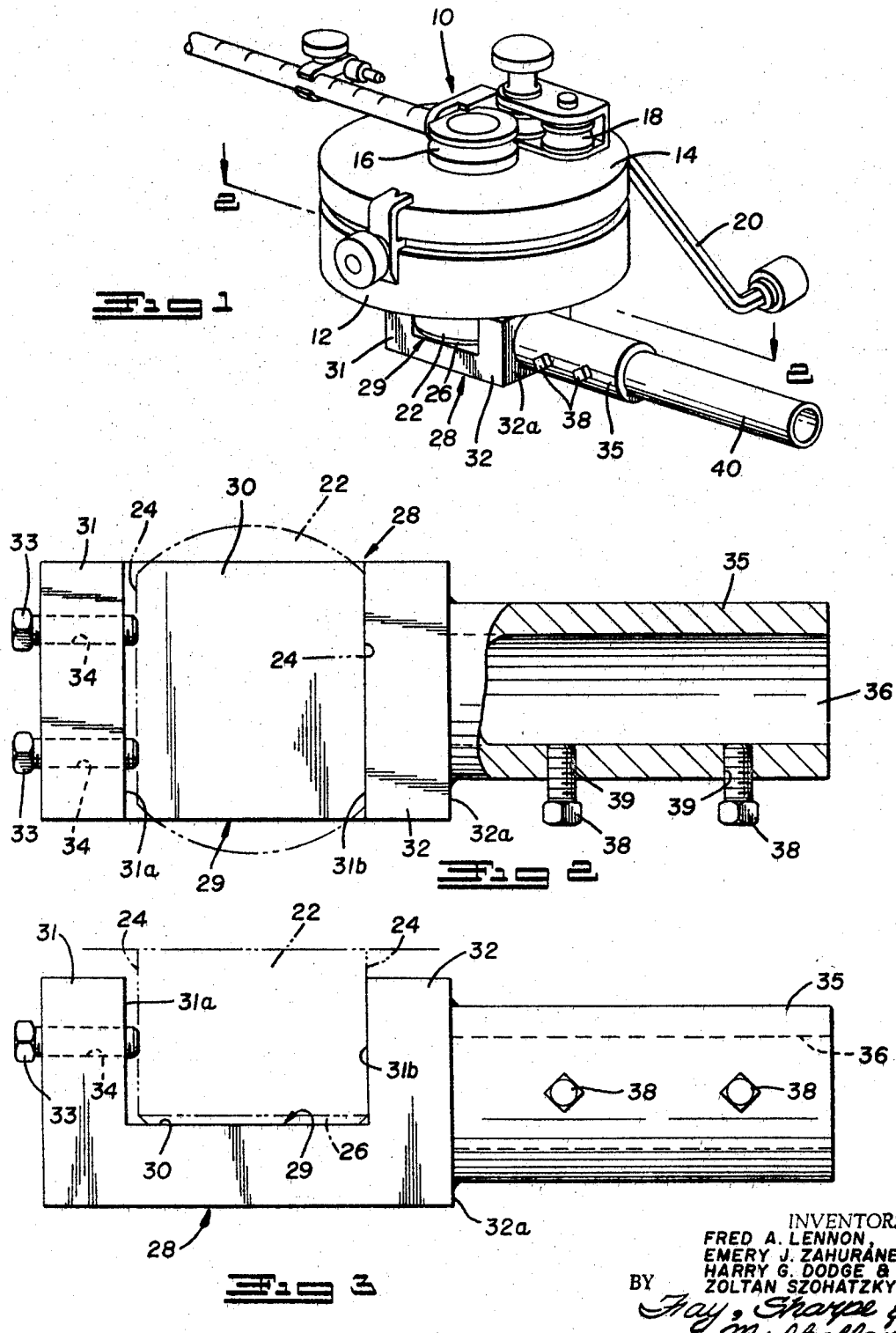

3,475,948
TOOL HOLDING DEVICE
Fred A. Lennon, Chagrin Falls, Emery J. Zahuranec, Solon, Harry G. Dodge, Painesville, and Zoltan Szohatzky, Mentor Township, Lake County, Ohio, assignors to Crawford Fitting Company, Solon, Ohio, a corporation of Ohio
Filed Oct. 20, 1967, Ser. No. 676,946
Int. Cl. B21j 13/08
U.S. Cl. 72—462                                 4 Claims

ABSTRACT OF THE DISCLOSURE

A tool holding device having a tool holding recess formed by a supporting seat and two holding arms, one of the holding arms having fastening means to retain a tool in the recess and the other arm having a sleeve attached thereto. The sleeve is adapted to receive and releasably to secure an extension means which can be held by a supporting or clamping device which is not capable of directly supporting the tool.

---

This invention is particularly directed to solving a problem encountered most often by a construction worker, pipe fitter, plumber, or other artisan who performs the majority of his work on a particular job site as opposed to a shop or plant wherein a large amount of equipment is available. It is often necessary for the artisan to use a bulky and awkward tool whose sole means of support is a clamping block, tool pads or the like which would be best supported by a bench vise or other large supporting structure not present on the job site.

In the circumstances noted above, the artisan has been forced to use a portable bench vise which might be, for example, secured to a board, but which usually is not of large enough size nor of sufficient holding power to provide a solid base upon which to mount, for example, a tube bender. If a tube bender were mounted on a small portable bench vise, the rotation of the crank arm would tend to cause twisting, turning and/or raising of the bender during the bending operation and severely hamper the ability not only to properly actuate the tool, but also to obtain adequate and satisfactory results.

Invariably, however, where a bulky tool holder is not present or accessible, the artisan using a tube bender or similar tool will have available a pipe vise. The presence of a pipe vise nearby would, of course, be necessitated by its use for threading, deburring, etc. of pipes and tubes.

The prior art devices in attempting to solve the problems noted above have provided work holders which are heavy and/or bulky and are therefore not appropriate for efficient and/or economical use by the workman or artisan in the field. Further, the prior art has failed to provide a lightweight and easily maneuverable tool holding device which is capable of rendering firm and proper support to a portable work piece or tool which is bulky or cumbersome unless properly supported.

SUMMARY OF THE INVENTION

This invention concerns, broadly, a tool holding device. More particularly, this invention concerns a tool holding device comprising a generally U-shaped block forming a tool holding recess which is defined by a supporting seat and the inner faces of at least two holding arms. A sleeve is provided which is attached to the outer face of one of the arms and into which a pipe or similar extension structure may be inserted. The extension is then clamped in a supporting structure, for example, a pipe vise. Suitable means are also provided for fastening a tool in the tool holding recess and for fastening the extension structure in the sleeve. This invention then provides a solution to the situation above noted and often confronting the plumber, construction worker, pipe fitter, or the like in attempting to find a suitable supporting apparatus for a tool having a depending clamping block, tool pads, or the like as its sole means of support.

Solely for purposes of illustration, the invention will be described in its use as a lightweight and portable support for a tube bender of the type described in U.S. Patent No. 3,236,082. It should be understood that this invention may be used to support any tool having as its primary means of support a depending clamping block, tool pads, etc. The tube bender of Patent No. 3,236,082 has a base plate with a depending clamping block which has two faces of generally flat surface forming tool pads for reception and retention by holding arms of a suitable tool holder. Attached to the base plate is a cover plate which encloses a gear structure and upon which a mandrel and two forming rolls are positioned. A crank arm extends from one side of the base plate generally at a plane with one of the sides of the clamping block adjacent one of the flat tool pad faces. This positioning of the crank arm insures that the plane of rotation of the crank arm will be at right angles to the flat faces of the clamping block and therefore twisting, turning or raising of the bender during the bending operation is effectively eliminated (assuming that a solid supporting structure is grasping the clamping block).

This invention, therefore, contemplates a tool holding device having a work holding recess formed by a supporting seat and the inner faces of at least two holding arms which extend outwardly and transversely from the supporting seat. One of the holding arms is adapted to receive fastening means such as set screws, cam lock means, or the like which pass through the outer face of the holding arm at a transverse angle and are adapted to hold securely the clamping block of a tube bender within the tool holding recess. In the case where set screws, for example, are used, they are of a length greater than the lateral width of the holding arm through which they pass and in a tightened position will extend beyond the perimeter of the holding arm and into the tool holding recess. Therefore upon placement of a tube bender of the type above described in the tool holding recess, the clamping block rests on the supporting seat of the tool holding device. One side of the clamping block is then butted against the holding arm opposite the fastening means. The fastening means are then tightened and the clamping block will be securely held in the work holding recess by the ends of the fastening means, the supporting seat and the other holding arm.

The other holding arm has integral with it a sleeve which is attached at generally right angles to the outer face of the arm. For reasons to be later discussed, the central longitudinal axis of the sleeve preferably intersects the geometrical center of the outer face of this other holding arm. The sleeve is adaptde to receive an extension means, for example, a length of pipe, and has fastening means extending laterally therethrough firmly to secure the extension means in the sleeve. Upon securement of the extension means in the sleeve, the extension means, i.e., the length of pipe, may then be secured in a pipe vise, for example.

By utilizing the teaching of this invention an extremely rigid supporting structure is provided which can easily and readily be adapted to hold a generally cumbersome tool and which can be easily carried and used at various places on a job site or at different and varied locations.

Continuing the discussion of this invention in terms of its use with a tube bender, the clamping block of the bender will be placed in the work holding recess and attached in the fashion above described. The tendency of the tube bender to be twisted, turned or raised by the rotational forces of the crank arm is eliminated by orienting the plane of the crank arm at right angles to the faces of the holding arms of the work holding recess, effectively to counteract and eliminate the rotational forces noted above. In this connection, it has been found that the sleeve should preferably be attached to one of the holding arms at the point where its central longitudinal axis will intersect the geometrical center of the outer face of the holding arm. This, in effect, centers the sleeve on the holding arm. If the sleeve is attached at a point off center of the holding arm, it has been found that twisting and turning forces exerted by the crank arm are not as effectively reduced and/or eliminated.

With reference to the accompanying drawings:

FIG. 1 is a perspective view of the tool holding device incorporating the principles of this invention, as it might support a tube bender of the type described in U.S. Patent No. 3,236,082;

FIG. 2 is a cross sectional view, in enlarged scale, of the holding device taken along line 2—2 of FIG. 1;

FIG. 3 is a side elevational view of the tool holding device of FIG. 2.

FIG. 1 shows a tool holding device supporting a tube bender 10. Tube bender 10 generally comprises a housing formed by a cup-shaped base plate 12 with a cover plate 14 attached thereto. This housing encloses the gear structure (not shown) of tube bender 10. Depending from base plate 12 is a clamping block 22 having two tool pads or flat faces 24 (as shown, in phantom, in FIGS. 2 and 3). In addition, tube bender 10 has a mandrel 16, forming rolls 18 and a crank arm 20.

The tool holding device of this invention consists of a generally U-shaped block 28 forming a tool holding recess 29. Recess 29 is defined by a supporting seat 30 and the inner faces 31a and 31b of holding arms 31 and 32 respectively. The supporting seat 30 and inner faces 31a and 31b are complementary in shape (in this case, flat) to the shape of the clamping block 22 and/or tool pads 24.

In the illustrated embodiment, holding arm 31 is provided with a pair of tapped holes 34 extending laterally therethrough. Threaded set screws 33 are adapted to be received in tapped holes 34 and thereby serve as means for holding clamping block 22 within the tool holding recess. Cam lock means or other suitable fasteners may of course be substituted for set screws 33.

Holding arm 32 has a sleeve 35 attached to its outer face 32a. Sleeve 35 has a central bore 36 passing therethrough whereby sleeve 35 is adapted to receive an extension means, for example, a section of pipe 40 (see FIG. 1). In the illustrated embodiment sleeve 35 is provided with laterally oriented tapped holes 39 into which threaded set screws 38 are received. It is understood that other fastening means may be used to secure the section 40 within the central cavity 36 of sleeve 35, such as a cam lock or the like.

Sleeve 35 is positioned with its central longitudinal axis intersecting the geometrical center of outer face 32a of holding arm 32. Although this positioning is not absolutely essential to the workability of this invention it is preferred because it complements the positioning of flat faces 24 of clamping block 22. Flat faces or tool pads 24 of clamping block 22 are positioned at generally right angles to the plane in which crank arm 20 turns. As discussed below, this provides optimum support and rigidity to the tube bender thereby facilitating turning of the crank and avoiding twisting or raising of the bender during the tube bending operation. By positioning sleeve 35 on face 32a at generally right angles to arm 32, the rigidity and support given to tube bender 10 by the positioning of tool pads 24 (at right angles to the axis of rotation of crank arm 20) is kept intact and in fact, considerably increased. That is, as crank arm 20 is turned in a clockwise direction the bender 10 has a tendency to twist about its vertical axis, and to rotate about the axis of rotation of the crank. The forces tending to produce these movements are counteracted and eliminated by the grasp of holding arms 31 and 32 exerting opposed forces. Further resistance is offered by sleeve 35 itself as well as the section 40 inserted therein which is firmly secured in a pipe vise.

In operation the clamping block 22 of tube bender 10 is placed with its base portion 26 resting on supporting seat 30 of U-shaped block 28. One tool pad 24 of clamping block 22 is butted against the inner face 31b of holding arm 32. The set screws or other fastening means of holding arm 31 are then tightened so that the ends thereof abut the opposite tool pad 24 of clamping block 22. A section of pipe 40 is then inserted in the central cavity 36 of sleeve 35. Set screws 38 of sleeve 35 are then tightened and pipe section 40 is securely held within sleeve 35. Section 40 is then tightly clamped in a pipe vise (not shown).

For ease of description, the principles of the invention have been set forth in connection with but a single illustrated embodiment showing my tool holding device. It is not our intention that the illustrated embodiment nor the terminology employed in describing it be limiting inasmuch as variations in these may be made without departing from the spirit of the invention. Rather we desire to be restricted only by the scope of appended claims.

We claim:

1. A tool holding device comprising:
   a unitary rigid block defining a generally U-shaped tool holding recess;
   said recess formed by a supporting seat and the inner faces of at least two spaced apart holding arms having inner and outer faces;
   said arms extending upwardly and transversely from said supporting seat;
   one of said holding arms having at least one releasable fastening means extending transversely therethrough whereby a tool may be securely held in said recess by said fastening means, the inner face of the other of said arms and said supporting seat;
   a rigid sleeve attached to the outer face of said other arm and extending transversely to and outwardly therefrom;
   said sleeve having its central horizontal axis in alignment with the intersection of the horizontal and vertical axes of said other arm;
   said sleeve having a central bore extending therethrough which is adapted to receive an extension means capable of securement in a suitable supporting device;
   said sleeve having releasable fastening means extending laterally therethrough;
   said fastening means passing through said sleeve, transverse to the central axis of said sleeve, and into said central bore whereby upon insertion into said central bore of said extension means, said extension means may be releasably secured in said sleeve, said fastening means and the walls of said sleeve.

2. The tool holding device of claim 1 wherein said supporting seat and inner faces of said holding arms are complementary in shape to the portion of the tool inserted in said tool holding recess.

3. In the combination of a tool holding device and a tool of the type which includes a depending clamping block and a crank arm generally rotatable in a plane, the improvement wherein said tool holding device includes:
   a unitary rigid block defining a generally U-shaped tool holding recess formed by a supporting seat and the inner faces of at least two spaced holding arms having inner and outer faces which are generally transverse to the plane of rotation of said crank arm, said holding arms extending upwardly and transversely from said supporting seat;

at least one releasable fastening means disposed in one of said holding arms and extending transversely therethrough for securing said clamping block of said tool in said tool holding recess;

a rigid sleeve secured to the outer face of the other holding arm and extending generally transversely thereto and outwardly therefrom;

said sleeve having a central bore extending therethrough which is adapted to receive an extension means capable of securement in a suitable supporting device;

said sleeve having releasable fastening means extending laterally therethrough;

said fastening means passing through said sleeve transverse to the central axis of said sleeve, and into said central bore whereby upon insertion into said central bore of said extension means, said extension means may be releasably secured in said sleeve by said fastening means and the walls of said sleeve.

4. The combination of claim 3 wherein said sleeve has its central horizontal axis generally in alignment with the intersection of the horizontal and vertical axes of said other arm, whereby upon rotation of said crank arm forces tending to twist said tool about its vertical axis and rotate said tool about the axis of rotation of said crank arm are counteracted by oppositely directed holding forces exerted by the cooperation of said holding arms, said sleeve and said extension means.

References Cited

UNITED STATES PATENTS

| | | | |
|---|---|---|---|
| 29,623 | 8/1860 | Russell | 269—95 |
| 1,305,321 | 6/1919 | Tooker | 269—76 |
| 1,312,230 | 8/1919 | Booth | 269—97 |
| 2,907,238 | 10/1959 | White | 269—76 |

CHARLES W. LANHAM, Primary Examiner

LOWELL A. LARSON, Assistant Examiner

U.S. Cl. X.R.

267—76